United States Patent [19]
Hooijmans et al.

[11] Patent Number: 5,515,197
[45] Date of Patent: May 7, 1996

[54] COHERENT OPTICAL MULTICHANNEL RECEIVER

[75] Inventors: Pieter W. Hooijmans; Markus T. Tomesen; Petrus P. G. Mols, all of Eindhoven, Netherlands

[73] Assignee: U.S. Philips Corporation, New York, N.Y.

[21] Appl. No.: 335,921

[22] Filed: Nov. 8, 1994

Related U.S. Application Data

[63] Continuation of Ser. No. 243,426, May 16, 1994, abandoned, which is a continuation of Ser. No. 804,256, Dec. 4, 1991, abandoned.

[30] Foreign Application Priority Data

Dec. 17, 1990 [GB] England .................................. 9027276

[51] Int. Cl.$^6$ .................................................. H04B 10/06
[52] U.S. Cl. ........................................ 359/189; 359/194
[58] Field of Search ................................ 359/189–192, 359/194; 455/173.1, 182.2, 192.2, 265, 266, 307; 375/97

[56] References Cited

U.S. PATENT DOCUMENTS 4,556,866  12/1985  Gorecki ........................................ 375/88

FOREIGN PATENT DOCUMENTS

| 0052135 | 3/1985 | Japan | 359/191 |
|---|---|---|---|
| 0010937 | 1/1987 | Japan | 359/192 |
| 0018133 | 1/1987 | Japan | 359/191 |
| 0049338 | 3/1987 | Japan | 359/192 |
| 0147437 | 6/1989 | Japan | 359/191 |
| 2213014 | 8/1989 | United Kingdom | 359/189 |

*Primary Examiner*—Leslie Pascal
*Attorney, Agent, or Firm*—Robert J. Kraus

[57] ABSTRACT

A coherent optical multichannel receiver includes a frequency down-conversion stage (10) having a laser local oscillator (12) for producing an IF signal which is applied to two frequency detection paths (26,28), the outputs from which are subtracted in a subtractor (30) to provide a data signal. AFC signal producing means (18,34) are also connected to the subtractor (30). In order to avoid a false lock occurring when the receiver is out-of-lock, detection means are provided for detecting an out-of-lock situation. The detection means is coupled either to a bandpass filter (36 or 38) to alter a property of the bandpass filter when the receiver is out-of-lock so that the subtractor (30) provides a positive output which is used to offset the frequency detection characteristic so that it has a single positive zero crossing or to an offset voltage input $V_{o/s}$ in the AFC loop. The offset is removed automatically when the receiver returns to a lock situation.

15 Claims, 3 Drawing Sheets

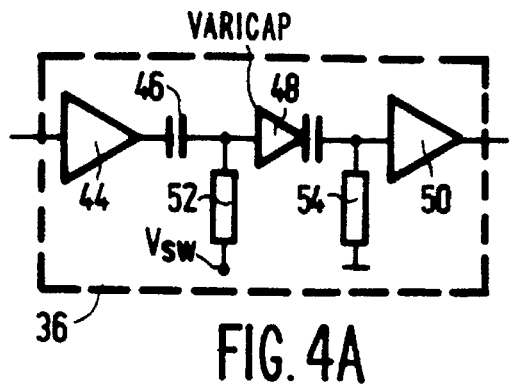
FIG. 4A
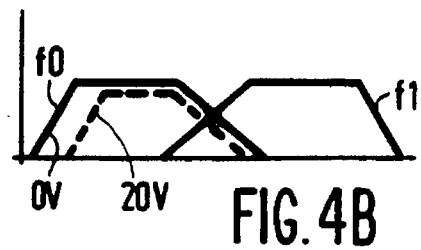
FIG. 4B
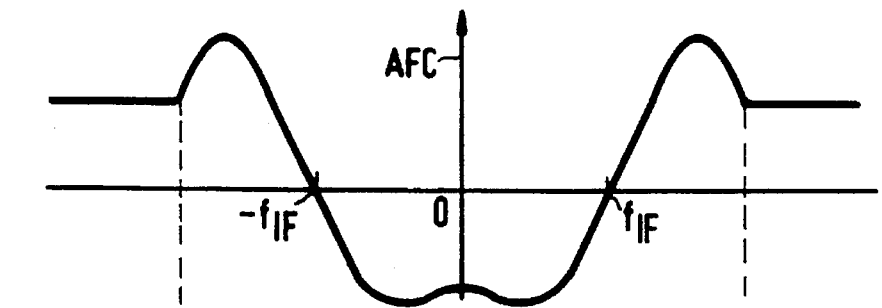
FIG. 5A
FIG. 5B
FIG. 5C
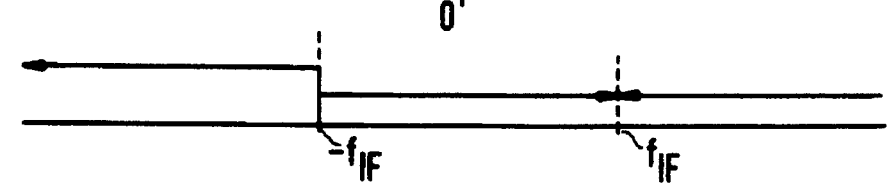
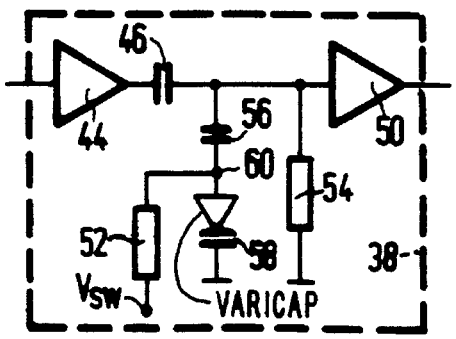
FIG. 6A
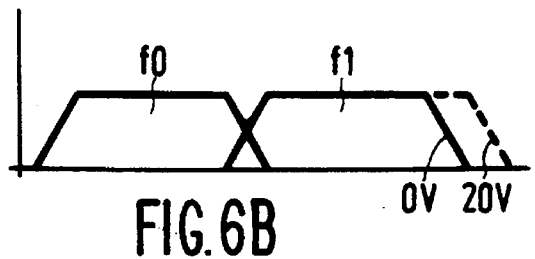
FIG. 6B

COHERENT OPTICAL MULTICHANNEL RECEIVER

This is a continuation of prior application Ser. No. 08/243,426, filed on 16 May 1994, which is a continuation of Ser. No. 07/804 256, filed on 4 Dec. 1991 both abandoned.

BACKGROUND OF THE INVENTION

The present invention relates to a coherent optical multichannel (CMC) receiver and particularly to channel selection in CMC receivers.

CMC systems are known per se and one such system is described by P. W. Hooijmans, M. T. Tomesen and P. P. G. Mols, "A coherent multi-bitrate multichannel system for simultaneous transmission of 140 Mb/s TV and 560 Mb/s HDTV signals" Proceedings of 16th European Conference on Optical Communication (ECOC), Amsterdam, 1990, paper WeG2.2. CMC systems make use of tunable lasers for selection of one of the many transmitter optical frequency division multiplexed (FDM) channels. The principle is essentially the same as the currently broadcast TV signals. In a CMC receiver the wavelength/frequency accuracy of the lasers used as local oscillators is one of the most critical features in these systems. Under ideal circumstances, this accuracy is of the order of several hundreds of MHz. The channel selection preset accuracy of the intermediate frequency (IF), that is, the frequency difference of the optical frequencies of the received signal and local oscillator, is therefore of the same order.

Another critical feature associated with channel selection in a CMC receiver is the phenomenon of false locks. This will be described further with reference FIGS. 1A and 1B, 2 and 3 of the accompanying drawings which show respectively a known FSK dual filter CMC-receiver, the pass bands of the dual filters, the automatic frequency control (AFC) frequency detection characteristic for an unmodulated carrier signal with the automatic gain control (AGC) off and the AFC/frequency detection characteristic for a modulated FSK signal with the AGC on. The CMC receiver shown FIG. 1A comprises an optical mixer 10 for frequency downconverting a received FSK signal having a bit rate of 140 Mb/s and a frequency deviation between the tones of 1200 MHz. A distributed feedback laser local oscillator 12 is connected to the mixer 10. The laser local oscillator 12 is tuned by a control current applied to its input 14. The control current comprises an AFC signal formed by a combination of a channel selection preset tuning current applied to a terminal 16 which is summed in a summer 18 with a current derived from a data output 20 of the receiver.

The IF signal derived from the mixer 10 is applied to a gain control amplifier 22 having a control input 24. The gain stabilised IF signal is then applied to two frequency detection paths 26,28 whose outputs are connected to a subtracting stage 30, the output of which forms the data output 20. An AGC signal is derived by connecting a baseband peak detector 32 to the output 20. The output of the peak detector 32 is connected to the control input 24. The low frequency and dc components present in the data output signal are supplied to an integrator 34 which has a second input for a dc offset voltage $V_{ofs}$. The purpose of the offset voltage will be discussed later.

The frequency detection paths 26,28 comprise bandpass filters 36,38 and square law detectors 40,42, respectively. The filters 36,38 have pass bands f0,f1, respectively, centered on different frequencies as shown FIG. 1B. The width of the passbands is the same. At any one time, the modulated signal will have only one of the two tones and accordingly only one of the detection paths will be active and providing an output to the subtracting stage 30. However when there is no modulation the outputs of both paths will be substantially equal amounts of noise which will be cancelled by the subtractor 30.

When the receiver has to select a channel, the AFC loop is interrupted and the local oscillator tuning current is preset to the required value, which value is stored within a memory (not shown). The channel selector (not shown) initiates a small frequency sweep of the local oscillator around the preset value. The AGC voltage will detect the presence of an IF signal whereafter the frequency control will be taken over by the AFC.

The frequency detection characteristic shown in FIG. 2 is mirrored about the f=0 axis due to the fact that the local oscillator 12 can be both at the left and right side of the received signal. It is desirable for the filters 36,38 to have identical transfer and noise characteristics. The frequency detection characteristic shown in FIG. 2 is used both for demodulation, that is IF-to-baseband conversion, and AFC. Referring now to FIG. 3, stable AFC locks can only occur in zero crossings of the detector characteristic under modulation with a positive slope. However with a small negative offset in the AFC loop it is possible to obtain a second stable zero at $f_{FL}$ (FIG. 2), while only one lock at $f_{IF}$ is allowed. In practice these two frequencies may be several GHz apart. However under operational conditions it is very difficult to determine if the receiver is locked at the required frequency.

In the circuit shown FIG. 1A it will be assumed that in the absence of IF, the AGC will cause the amplifier 22 to give maximum IF amplification. In this situation noise within the bandwidths of both IF filters 36,38 will be detected as squared IF (or N×N) noise by the frequency detector. If both filters 36,38 have identical characteristics, both detected outputs will be equal and hence give a zero output after subtraction. As a result the AFC will have no input which may cause the local oscillator to drift so that the receiver is possibly tuned to a false lock.

One method for avoiding false locks is to increase $V_{ofs}$ so that a detector characteristic of the type shown in FIG. 3 is obtained. Since there is only one positive slope zero crossing, false locks are avoided. However the effect of increasing $V_{ofs}$ is to shift the zero crossing point from $f_{IF}$ to $f'_{IF}$. This shift in the frequency of the zero crossing is undesirable because it could lead to errors in the data being detected.

SUMMARY OF THE INVENTION

An object of the present invention is to avoid the risk of false locks in a manner which does not increase the likelihood of errors in the detected data.

According to one aspect of the present invention there is provided a method of channel selection in a coherent optical multichannel receiver in which when the receiver is out-of-lock its frequency detection characteristic is automatically offset so that it has only a single zero crossing in the desired direction and when it is in lock the offset is removed automatically.

According to another aspect of the present invention there is provided a coherent optical multichannel (CMC) receiver comprising a frequency detection circuit, characterised in that means are provided which are responsive to the detection of an out-of-lock situation for automatically offsetting the frequency detection characteristic of the receiver so that it has only a single zero crossing in the desired direction and for automatically removing the offset when said out-of-lock situation is not present.

By means of the method in accordance with the present invention, it is possible for a CMC receiver to have a minimal required preset accuracy of the LO laser. Also by offsetting the frequency detection characteristic, false locks are not possible. Also the change-over from a lock to an out-of-lock situation and vice versa can be made to occur smoothly so that the generation of transients is avoided.

In accordance with the present invention, these requirements can be met by altering the frequency detection characteristic in the out-of-lock situation from what it is in the in-lock situation. This may be done in several ways for example decreasing or increasing the bandwidth of one or other of the bandpass filters in the frequency detection circuits or reducing or increasing the amplification of one or other of these bandpass filters. By any one of these measures, in the out-of-lock situation, the noise produced by one of the filters will be different from that produced by the other of the filters, this difference being such as to produce a positive control input. In lock the filters revert to their normal, substantially identical bandwidths and gains. Alternatively when out-of-lock the offset voltage $V_{ofs}$ may be switched to a value which gives a frequency detection characteristic with only one zero crossing.

The present invention also relates to a coherent optical multichannel receiver comprising a frequency down-converter including a local oscillator comprising a laser for frequency down-converting a FSK signal to a respective one of two IF signals, first and second signal detection paths coupled to the output of the frequency down-converter, subtracting means having inputs connected to outputs of the respective detection paths, each signal detection path including a bandpass filter and a square-law detector, an output of the subtracting means being connected to data demodulating means and to an automatic frequency control (AFC) means for controlling the frequency of the local oscillator, characterised in that the AFC means includes means to detect the absence of an IF signal, means responsive to the detection of the absence of an IF signal for altering a property of one of the bandpass filters in the signal detection paths so that when the receiver is out-of-lock a non-zero output is produced by the subtracting means, which non-zero output is used to offset positively the AFC characteristic so that it has one zero crossing, said means also being responsive to the presence of an IF signal for removing the alteration made to the property of the one of the bandpass filters.

BRIEF DESCRIPTION OF THE DRAWINGS

The present invention will now be explained and described, by way of example, with reference to FIGS. 4 to 9 of the accompanying drawings. In the drawings:

FIG. 4B illustrates in full lines the normal bandwidths of the two filters and in broken lines the reduced bandwidth of one of the two filters, FIG. 5A illustrates the offset AFC frequency detection characteristic, FIG. 5B the AGC characteristic and FIG. 5C the direction of AFC control, FIG. 6A illustrates one embodiment for effecting a bandwidth increase of a bandpass filter, FIG. 6B illustrates in full lines the normal bandwidths of the two filters and in broken lines the increased bandwidth of one of the two filters.

In the drawings the same reference numerals have been used to illustrate corresponding features.

DETAILED DESCRIPTION OF THE PREFERRED EMBODIMENTS OF THE INVENTION

Figure 1A:
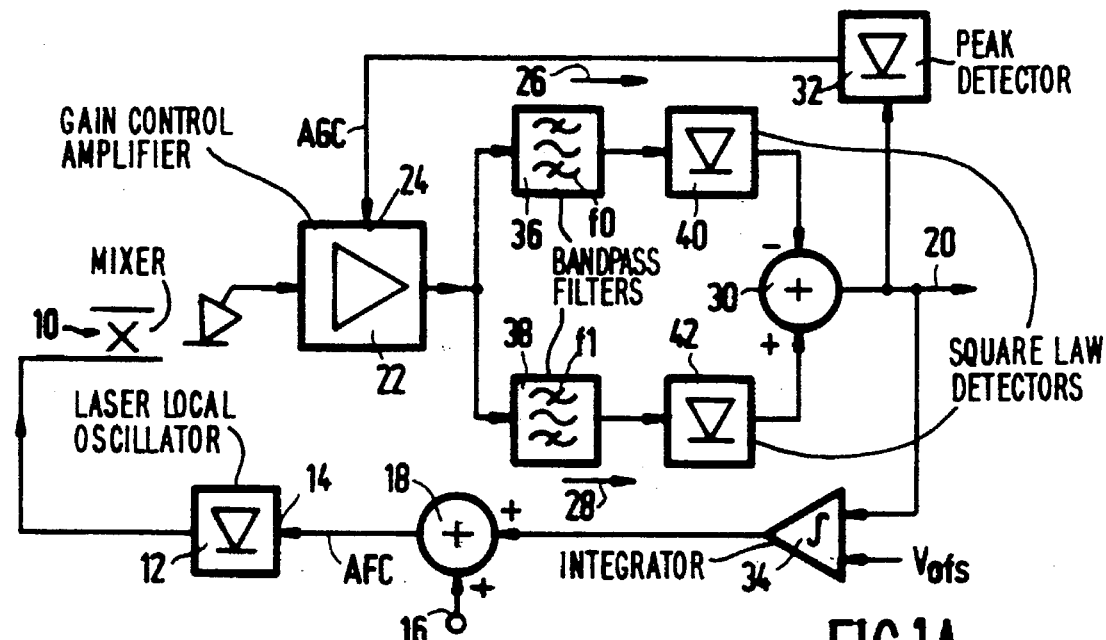
FIG. 1A is a block schematic diagram of a known type of CMC receiver.

A CMC receiver made in accordance with the present invention will generally be of the same construction as that shown in FIG. 1A but various features have been altered in order to automatically offset the frequency detection characteristic when the receiver is out-of-lock. Embodiments will be described whereby on detection of out-of-lock a property of one of the bandpass filters 36,38 is changed to provide the offset voltage. In the interests of brevity the description of the overall receiver architecture will not be repeated.

FIG. 4A and B illustrate an embodiment in which the bandwidth of the filter 36 is narrowed. The filter 36 is essentially an RC filter and comprises an amplifier 44 having an input for an IF signal and an output coupled to a series capacitor 46 having a value of 1 pF. A varicap device 48 is connected between the series capacitor 46 and the input to another amplifier 50. A resistor 52 is coupled to a junction of the capacitor 46 and the varicap device 48, a d.c. control voltage $V_{sw}$ is applied to the resistor 52 in order to change the value of capacitance due to the varicap device 48 from say 20 pF for a $V_{sw}$ equal to 0 V to say 1 pF for a $V_{sw}$ equal to 20 V. Another resistor 54 is connected between ground and a junction of the varicap 48 and the input to the amplifier 50.

The control voltage $V_{sw}$ can be derived from the AGC voltage using a Schmitt trigger circuit (not shown). The threshold value of the Schmitt trigger should be set at a value that is not attained under normal conditions. Thus when the AGC voltage exceeds the threshold value then the control voltage $V_{sw}$ increases rapidly.

By altering $V_{sw}$ between 0 V and 20 V a variation of between about 1 pF and 0.5 pF can be achieved and as shown in part B of FIG. 4 the lower frequency part of the f0 frequency band is lost by switching $V_{sw}$ to 20 V.

Figure 3:
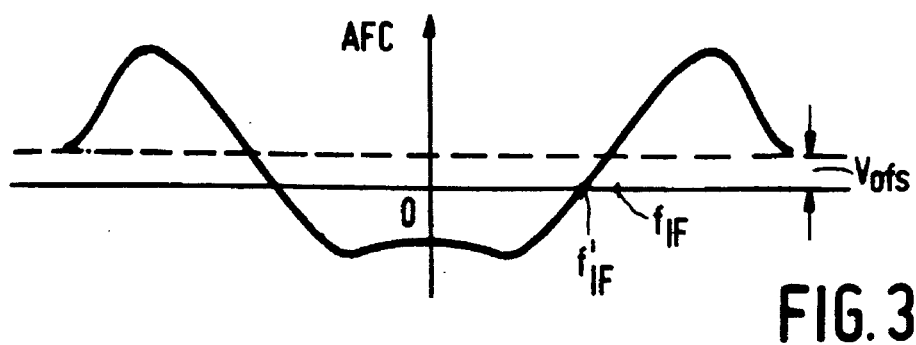
FIG. 3 illustrates an AFC frequency detection characteristic for a modulated FSK signal with the AGC on, FIG. 4A illustrates one embodiment for effecting bandwidth reduction of a bandpass filter.

FIG. 5A shows the AFC characteristic which is similar to that shown in FIG. 3. The AGC characteristic, shown in FIG. 5B, shows the AGC voltage threshold $V_{TH}$ in broken lines. FIG.5C shows the direction of AFC control, thus if the frequency is less than $-f_{IF}$ the AFC causes the receiver to lock onto the adjacent channel. However if the frequency is greater than $-f_{IF}$ but less than $-f_{IF}$ of the adjacent, higher frequency channel then the receiver will lock onto $f_{IF}$. As a result false locks are avoided.

FIGS. 6A and B show a variant of the arrangement shown in FIGS. 4A and B. In FIG. 6B the bandwidth f1 of the filter 38 is increased in the out-of-lock situation. Referring of FIG. 6A, the bandpass filter 38 comprises an input amplifier 44 whose output is coupled by a series capacitor 46 to an output amplifier 50. A shunt R-C circuit is connected to the signal path between the capacitor 46 and the output amplifier 50. The shunt circuit comprises a fixed value capacitor 56 connected in series with a varicap device 58, and a resistor 52 connected between an input for a dc control voltage $V_{sw}$ and a junction 60 between the capacitor 56 and the varicap device 58. A resistor 54 is connected in parallel with the capacitor 56 and the varicap device 58. In lock the capacitance of the varicap device is high but out-of-lock its capacitance is low. An advantage of increasing the bandwidth (FIG. 6B) over decreasing the bandwidth (FIG. 4B) is that the lock bandwidth becomes greater.

Figure 1B:
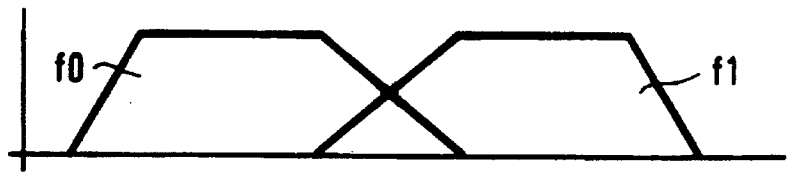
FIG. 1B shows the characteristics of the two bandpass filters used in part A of FIG. 1.
Figure 2:
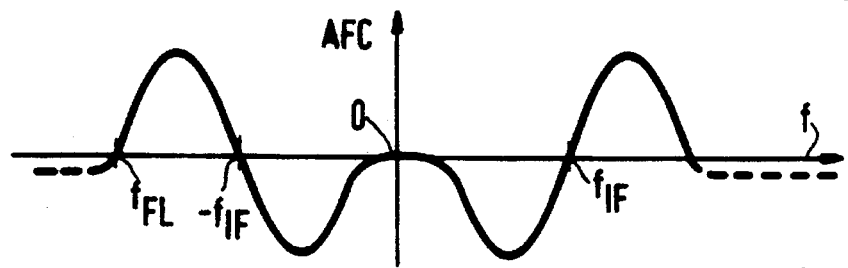
FIG. 2 illustrates an AFC frequency detection characteristic for an unmodulated carrier with the AGC off.
Figure 7:
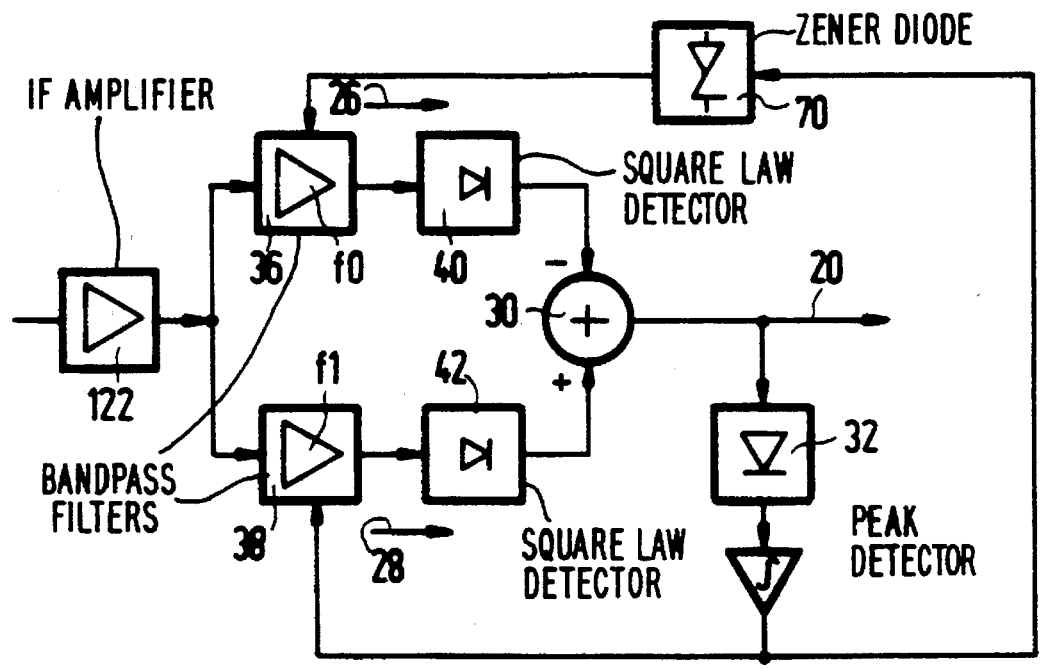
FIG. 7 is a block schematic diagram of a portion of a CMC receiver having IF amplification control applied to the bandpass filters.
Figure 8:
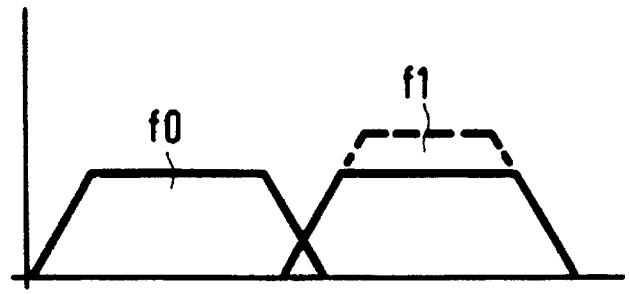
FIG. 8 shows filter characteristics of which one is subject to asymmetrical amplitude control.

FIG. 7 shows an embodiment of the invention in which the AGC is used to alter the amplification of one of the bandpass filters 36,38. In this embodiment it is the gain of the bandpass filter 38 which is altered so that it is greater when out-of-lock, as shown in broken lines in FIG. 8. As AGC is applied to both the bandpass filters 36,38, the IF amplifier 122 is not gain controlled as in FIG. 1.

In order to prevent the gain of the bandpass filter 36 from following that of the filter 38 in the out-of-lock situation, a voltage limiter, for example a zener diode 70, is used to limit the gain control voltage and thus the amplification of the filter 36 and thereby provide unequal inputs to the subtracting stage 30.

Figure 9:
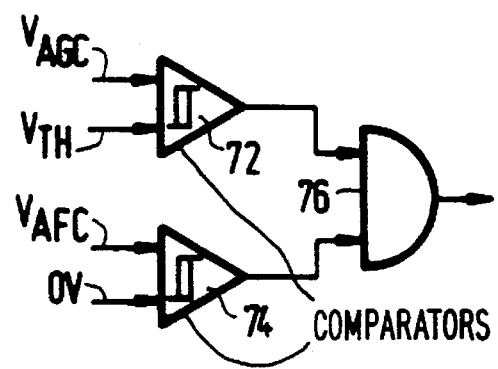
FIG. 9 shows one method by which a control signal for altering the characteristic of one of the filters can be derived using both AFC and AGC voltages.

FIG. 9 illustrates another method by which a switch control voltage $V_{sw}$ can be derived in the out-of-lock situation. This method makes use of both the AGC and AFC voltages, $V_{AGC}$ and $V_{AFC}$, respectively, when deriving $V_{sw}$. An out-of-lock condition is detected using a comparator 72 in which the AGC voltage, $V_{AGC}$, is compared with a threshold voltage, $V_{TH}$ (see FIG. 5B), and a high output is produced when $V_{TH}$ is greater than $V_{TH}$. In another comparator 74, the AFC voltage, $V_{AFC}$, is compared with a zero volt level 0 V, and its output goes high when $V_{AGC}$ is greater than 0 V. An AND gate 76 is provided having inputs connected to the comparators 72,74. When both inputs are high, then an output is produced which is applied to the varicap device 48 (FIG. 4 and FIG. 6A) or to some other suitable means for altering the bandwidth or gain of one of the bandpass filters 36,38.

In a non-illustrated embodiment of the invention the bandwidths and gains of the filters 36,38 remain constant and the offset of the frequency detection characteristic is achieved by varying $V_{ofs}$ (FIG. 1A) when the AGC voltage exceeds a threshold or an output is produced by the AND gate 76 (FIG. 9).

The method in accordance with the present invention has several important advantages over that disclosed with reference to FIG. 1A and B. First of all it features distinctly different behaviour in lock and out-of-lock conditions. The detection characteristic has only one zero-crossing, so false locks are not possible. The lock frequency is exactly at the required IF frequency. The change-over from out-of-lock to lock is smooth because as soon as the IF signal falls within the IF bandwidth the AGC voltage drops and the IF characteristics switches back to normal. The influence of the NxN noise (which was used for out-of-lock control) becomes negligible as the IF power increases. Finally the out-of-lock control can be made as sensitive as required by adjusting the maximum IF amplification and bandwidth reduction.

The required preset accuracy of the receiver is minimal. By placing the preset value of the IF between two channels one obtains pull-in to the left channel due to the positive out-of-lock control voltage. To give a numerical example: the CMC system has a channel separation of 10 GHz, while the frequency detection zeros are at about 1.2 GHz. If the preset value is made +3.8 GHz the LO will be pulled to the zero at 1.2 GHz by the positive control voltage. Only when the preset value is more than 5 GHz to the right (+8.8 GHz is identical to the negative zero crossing at −1.2 GHz) the LO will be pulled to the channel at the right. Only for a negative preset inaccuracy of 5 GHz will the IF fall below the negative zero crossing of the required channel, and the LO will be pulled one channel too far to the left. The total preset window is thus equal to the channel distance (10 GHz) and the required preset accuracy is minimal with 5 GHz. Locking to a different channel can in the receiver made in accordance with the present invention be easily monitored by looking at the channel identification or LO laser currents.

From reading the present disclosure, other modifications will be apparent to persons skilled in the art. Such modifications may involve other features which are already known in the design, manufacture and use of CMC receivers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A method of tuning a coherent multichannel receiver having lock and out-of-lock modes wherein an error signal is produced to effect tuning of the receiver to a desired frequency, said method comprising the steps of:

a) deriving an error signal representing a deviation of the actual tuned frequency from said desired frequency according to a frequency detection characteristic having a plurality of zero crossings;

b) offsetting said error signal by an offset value so that said frequency detection characteristic has only one zero crossing in a direction leading to said desired frequency when said receiver is out of lock; and d) removing said offset value from said error signal when said receiver is in lock.

2. A coherent optical multichannel receiver having lock and out-of-lock modes and wherein an error signal is produced to effect tuning of the receiver to a desired frequency, said receiver comprising:

a) a frequency detection circuit which derives an error signal according to a frequency detection characteristic which represents a deviation of the actual tuned frequency from said desired frequency;

b) tuning means for adjusting the actual tuning frequency in response to said error signal; and c) offset means for offsetting said error signal by an offset value so that said frequency detection characteristic has only one zero crossing in a direction leading to the desired frequency when said receiver is out-of-lock, and for removing said offset value from said error signal when said receiver is in lock.

3. A coherent optical multichannel receiver as claimed in claim 2, wherein said offset means is adapted in response to detecting an out-of-lock situation to provide an offset voltage for offsetting the frequency detection characteristic of the receiver.

4. A coherent optical multichannel receiver as claimed in claim 2, wherein the frequency detection circuit is a dual path circuit, in that said means is adapted in response to detecting an out-of-lock situation to vary a property of one of the paths so that its response to noise is different and in that means are provided which are responsive to the difference for offsetting the frequency detection characteristic of the receiver.

5. A coherent optical multichannel receiver as claimed in claim 4, wherein each frequency detection path comprises a bandpass filter and a square law detector, in that when in lock the bandpass filters have substantially the same gains and pass bandwidths but are centered on different frequencies, and in that at least one of the bandpass filters includes means responsive to the occurrence of an out-of-lock situation for altering a property of the bandpass filter so that there is a difference in the amplitude of the noise signal produced by the respective square law detectors.

6. A coherent optical multichannel receiver as claimed in claim 5, wherein the at least one bandpass filter includes a frequency alterable element which in response to the detection of an out-of-lock situation alters the pass bandwidth of the filter relative to that of the other bandpass filter.

7. A coherent optical multichannel receiver as claimed in claim 5, wherein the at least one bandpass filter includes a gain varying element which in response to the detection of an out-of-lock situation alters the gain of the filter relative to that of the other bandpass filter.

8. A coherent optical multichannel receiver as claimed in claim 5, wherein subtractor means is coupled to outputs of the square law detectors and automatic gain control signal deriving means is coupled to the subtractor means, in that each of the bandpass filters includes gain varying means responsive to the AGC signal and in that voltage amplitude limiting means is connected in the AGC signal path to one of the bandpass filters.

9. A coherent optical multichannel receiver as claimed in claim 5, wherein subtractor means is coupled to outputs of the square law detectors, in that automatic gain control signal deriving means and automatic frequency control signal deriving means are coupled to an output of the subtractor means, and in that an out-of-lock detection means comprises first and second comparators and coincidence logic means coupled to outputs of the first and second comparators, whereby the automatic gain control signal is compared with a threshold value in the first comparator, which produces an output in response to the automatic gain control signal exceeding the threshold value, the automatic frequency control signal is compared with a reference value in the second comparator, which produces an output in response to the automatic frequency control signal exceeding the reference value, and the coincidence means produces an out-of-lock signal in response to said outputs being produced by the first and second comparators.

10. A coherent optical multichannel receiver comprising a frequency down-converter including a local oscillator comprising a laser for frequency down-converting a FSK signal to a respective one of two IF signals, first and second signal detection paths coupled to the output of the frequency down-converter, subtracting means having inputs connected to outputs of the respective detection paths, each signal detection path including a bandpass filter and a square-law detector, an output of the subtracting means being connected to data demodulating means and to an automatic frequency control means for controlling the frequency of the local oscillator, characterised in that the automatic frequency control means includes means to detect the absence of an IF signal, means responsive to the detection of the absence of an IF signal for altering a property of one of the bandpass filters in the signal detection paths so that when the receiver is out-of-lock a non-zero output is produced by the subtracting means, which non-zero output is used to offset positively the AFC characteristic so that it has one zero crossing, said means also being responsive to the presence of an IF signal for removing the alteration made to the property of the one of the bandpass filters.

11. A frequency detection circuit for use in a coherent optical multichannel receiver, wherein means are provided which are responsive to the detection of an out-of-lock situation for automatically offsetting the frequency detection characteristic of the receiver so that it has only a single zero crossing in a desired direction and for automatically removing the offset when said out-of-lock situation is not present, wherein the frequency detection circuit comprises a dual path circuit and said means is adapted in response to detecting the out-of-lock situation to vary a property of one of the paths so that its response to noise is different and in that means are provided which are responsive to the difference for offsetting the frequency detection characteristic of the receiver, wherein each frequency detection path comprises a bandpass filter and a square law detector, in that when in lock the bandpass filters have substantially the same gains and pass bandwidths but are centered on different frequencies, and in that at least one of the bandpass filters includes means responsive to the occurrence of an out-of-lock situation for altering a property of the bandpass filter so that there is a difference in the amplitude of the noise signal produced by the respective square law detectors.

12. A frequency detection circuit as claimed in claim 11, wherein the at least one bandpass filter includes a frequency alterable element which in response to the detection of an out-of-lock situation alters the pass bandwidth of the filter relative to that of the other bandpass filter.

13. A frequency detection circuit as claimed in claim 11, wherein the at least one bandpass filter includes a gain varying element which in response to the detection of an out-of-lock situation alters the gain of the filter relative to that of the other bandpass filter.

14. A frequency detection circuit as claimed in claim 11, wherein subtractor means is coupled to outputs of the square law detectors and automatic gain control signal deriving means is coupled to the subtractor means, in that each of the bandpass filters includes gain varying means responsive to the AGC signal and in that voltage amplitude limiting means is connected in the AGC signal path to one of the bandpass filters.

15. A frequency detection circuit as claimed in claim 11, wherein subtractor means is coupled to outputs of the square law detectors, in that automatic gain control signal deriving means and automatic frequency control signal deriving means are coupled to an output of the subtractor means, and in that an out-of-lock detection means comprises first and second comparators and coincidence logic means coupled to outputs of the first and second comparators, whereby the automatic gain control signal is compared with a threshold value in the first comparator, which produces an output in response to the automatic gain control signal exceeding the threshold value, the automatic frequency control signal is compared with a reference value in the second comparator, which produces an output in response to the automatic frequency control signal exceeding the reference value, and the coincidence means produces an out-of-lock signal in response to said outputs being produced by the first and second comparators.

* * * * *